United States Patent [19]

Simeonov et al.

[11] 3,892,571

[45] July 1, 1975

[54] PHOTOMASKS

[75] Inventors: Vasil Dragomirov Simeonov; Borislav Dimitrov Mednikarov; Jordan Petrov Malinowski, all of Sofia, Bulgaria

[73] Assignee: Zlafop Pri Ban of Bulgaria, Bulgaria

[22] Filed: July 5, 1973

[21] Appl. No.: 376,712

[30] Foreign Application Priority Data

July 17, 1972 Bulgaria ................................ 20980

[52] U.S. Cl. ...................... 96/68; 96/35.1; 96/36.2; 96/94 BF; 427/255; 427/404; 428/336

[51] Int. Cl. .......................... G03c 1/76; G03c 5/00

[58] Field of Search ......... 96/67, 68, 36.2, 83, 35.1, 96/115, 38.3, 94 BF; 117/34

[56] References Cited

UNITED STATES PATENTS

| | | | |
|---|---|---|---|
| 3,245,793 | 4/1966 | Smith | 96/35.1 |
| 3,488,194 | 1/1970 | Lydick et al. | 96/38.3 |
| 3,567,445 | 3/1971 | Atkinson et al. | 96/68 |
| 3,674,492 | 7/1972 | Goldrick et al. | 96/68 |
| 3,681,227 | 8/1972 | Szupillo | 117/211 |
| 3,730,720 | 5/1973 | Cuthbert et al. | 96/38.3 |
| D870,022 | 1/1970 | Kenyon | 96/71 |

OTHER PUBLICATIONS

IBM, Vol. 15, No. 5, Oct. 1972, pp. 1595–1596.

*Primary Examiner*—Mary F. Kelley
*Attorney, Agent, or Firm*—Armstrong, Nikaido & Wegner

[57] ABSTRACT

A photographic material is produced for use in the direct production of photomasks with photographic material comprises i. a glass substrate;

ii. a layer of metal or metal oxide deposited on said glass substrate;

iii. a photoresist deposited on said layer of metal or metal oxide;

iv. a layer of synthetic resin deposited on said photoresist; and v. a layer of light-sensitive silver halide deposited by evaporation on the synthetic resin.

20 Claims, No Drawings

PHOTOMASKS

The present invention relates to a photographic material for direct production of photomasks for use in the production of microelectronic circuits.

Photomasks find wide application in the production of microelectronic circuits. The production of photomasks is based on known photolithographic techniques. First an original art work is made and then transferred by photo-optical reduction on to a high resolution photosensitive plate. For this purpose special repeater devices are used where, for technical and technological reasons, the light source is of limited power. Emulsion plates are sufficiently sensitive to be exposed to the limited light energy of modern repeater devices. The photomasks obtained, however, are easily subjected to mechanical wear and after several contact printings on a semiconductor wafer the photomasks are damaged. As a result, metal copies of the emulsion photomasks have been introduced. The image obtained on the emulsion plate is transferred by an additional contact printing process on to a chromium plate consisting of a glass substrate, a chromium layer and a layer of photoresist.

After suitable exposure (usually with high intensity ultra violet light) and depending on the photoresist used, a positive or negative copy of the original is obtained. Direct exposure of the photoresist in the repeater devices generally used nowadays is not possible because of the low sensitivity of the photoresist.

The chromium photomasks obtained by contact printing are several times more resistant to wear than the emulsion ones. The transfer of the image from the emulsion master mask on to the chromium plate, however, introduces imperfections in the reproduction of microdetails. This phenomenon is attributed to the structure of the emulsion photomasks. The image is formed in the thickness of the emulsion layer and after processing and fixation a clearly expressed relief of the order of several microns is obtained. This makes it impossible to achieve good contact between the emulsion and the chromium plate, which results in a poorer quality image being obtained. Therefore, contact printing of emulsion photomasks is not a satisfactory method of obtaining good quality photomasks for microelectronics. On the other hand, as already mentioned, the low sensitivity of the photoresist renders impossible the direct use of chromium plates in the repeater devices.

Recently in Bulgaria the advantages of evaporated layers of silver halide as photographic material have been realised. In a conventional photographic emulsion the photosensitive substance — microcrystals of silver halide — is dispersed in a comparatively thick layer of gelatine. Because of this, conventional photographic materials are optically heterogenous with strongly expressed Raleigh scattering of light. It is known that the intensity of the scattered light increases with the decrease of the wavelength. On the other hand, the resolving power of the optical systems used to project the image increases towards the short wavelength end of the spectrum. This automatically limits in principle the possibility of using emulsion photographic materials for a qualitative registration of objects within the micron range. Since evaporated layers can be made optically homogenous, these principal difficulties are substantially avoided. Furthermore, the small thickness of evaporated layers avoids the obtaining of unsharp images outside the depth of sharpness of the objectives used in microphotography which is usually much smaller than the thickness of conventional photographic emulsions.

However, the simple substitution of evaporated layers for emulsion materials using the accepted technique of contact printing on chromium plates will not prove substantially advantageous since contact printing is essential in both cases. In practice the contact printing operation introduces a fundamental loss of accuracy in registering the details of the original image.

According to the present invention there is provided a photographic material for use in the direct production of photomasks which photographic material comprises a glass substrate, a layer of metal or metal oxide deposited on the glass substrate, a photoresist deposited on the layer of metal or metal oxide, a layer of synthetic resin deposited on the photoresist and a layer of light-sensitive silver halide deposited by evaporation on the synthetic resin.

The processing of the photographic material of the invention avoids entirely the use of conventional contact printing. Due to its sensitivity, the material can be directly exposed with a repeater device, which is impossible in the case of chromium plates because of the low sensitivity of the photoresist. The material possesses also resistance to mechanical wear of hard layers used in practice.

According to a further aspect of the invention there is provided a method for the preparation of the said photographic material which method comprises depositing a thin layer of metal or metal oxide on a glass substrate, coating a photoresist layer on the said layer of metal or metal oxide, coating an isolating intermediate layer, which may include a suitable dye, and evaporating a thin layer of silver halide on to the intermediate layer.

Thus an example of a photographic material for direct production of photomasks consists of a glass substrate, evaporated metal layer of chromium, nickel, nichrome, or cathode sputtered from iron oxide, a layer of positive or negative photoresist, an isolating intermediate layer and, on the top, an evaporated silver halide layer suitably sensitized.

An important feature of the invention is the presence of the isolating intermediate layer of synthetic resin between the photoresist layer and the evaporated silver halide layer. Experiments have shown, surprisingly, that without such an isolating intermediate layer the evaporated silver halide penetrates partially into the photoresist making it impossible the proper processing of the lacquer. Besides that, this layer allows the introduction of dyes absorbing light longer than 400–450 nm, to which light only silver bromide is sensitive. In this way reverse reflection of actinic light from the chromium mirror is suppressed and the deterioration of the image is eliminated. The isolating intermediate layer should meet several requirements:

1. It should not dissolve in water, in order to allow the processing of the photographic material with water solutions.

2. It should not dissolve in the organic solvents used in the processing of positive or negative photoresists.

3. It should be readily removed by cheap and available solvents which do not affect the photoresist.

A number of synthetic resins meet these requirements. For example, when using a negative photoresist good results are obtained with phenol-formaldehyde resins soluble in ketones, ethers, and alcohols. In the case of a positive photoresist the phenol-formaldehyde resins should dissolve in hydrocarbons (aromatic, cyclic or saturated).

If a dye or combination of dyes is used in the isolating intermediate layer, the dye or dyes should meet the following requirements:

1. Absorb light with a wavelength longer than 400–450 nm, freely transmitting shorter wavelength light.
2. Dissolve in the solvents for the synthetic phenol-formaldehyde resins - ketones, ethers, alcohols and/or hydrocarbons.

These requirements are met by a number of azodyes, polymethin and pyrazolon dyes, e.g., chrysoidine, auramine, tartrazin, and the like.

A method for the preparation of the photographic material for micromasks is as follows: a layer of, for example, chromium, nickel or nichrome from 0.07 to 0.1 microns thick is evaporated in vacuum on to a glass substrate or a layer of iron oxide is coated on a glass substrate by cathode sputtering in an oxygen atmosphere. The metal or the metal oxide layer is then coated with a positive or negative photoresist from 0.8 to 1 microns thick. Coating is carried out by a known method, for example, whirling, dipping or spraying. On the photoresist an isolating intermediate layer, containing dye or a combination of dyes with spectral characteristics as mentioned above, is also coated by whirling, dipping or spraying. The thickness of the intermediate layer is preferably more than 0.08 microns. Now a thin photosensitive layer of silver halide, for example, silver bromide, silver chloride, silver iodide or a combination thereof, from 0.1 to 1 microns thick is evaporated on to the intermediate layer in vacuum. The silver halide layer is is sensitized by, for example, vacuum evaporation of a monoatomic metal layer realizing in this way a direct positive photographic system, or by dipping in a solution of gold-iridium salts obtaining thus a negative photographic system.

The invention is further illustrated in the following Examples.

EXAMPLE 1

On a well cleaned glass substrate of suitable flatness chromium from a tungsten boat at 1,600°C was evaporated for 5 minutes in a standard vacuum apparatus, maintaining the presssure below $10^{-4}$ torr, the distance between the boat and the substrate being 15 cm. A layer from 0.07 to 0.10 microns thick was obtained. In a laminar clean box a negative photoresist from 0.8 to 1 microns thick was coated by whirling on to the chromium layer. An intermediate layer of phenol-formaldehyde resin was then coated on top of the photoresist. For this purpose a mixture containing 2 parts of 4% solution in acetone of phenolformaldehyde resin and 1 part of 6% solution in acetone of chrysoidine was used. 0.5 ml of this coloured mixture was applied in the same way as the photoresist, to give a layer about 0.5 microns thick. The chromium plate with the isolating intermediate layer was baked for 30 min. at 80°C. A layer of pure silver bromide, synthesized by Malinowskit's mthod (J. Phot. Sci., 8, 69/1960) was now applied again by evaporation in vacuum, over about 15 min., using a tungsten boat heated at 650°–700°C to obtain a layer from 0.2 to 0.5 microns thick. Since the silver bromide was of high purity (a condition necessary for obtaining reproducible results) the layer obtained had practically no photographic sensitivity and had to be additionally sensitized. This can be done by any of the conventional methods and in this example was done by dipping the sample in a solution with the following composition:

| | |
|---|---|
| sodium aurothiosulphate | 20 mg |
| ammonium chloroiridate | 20 mg |
| gelatine | 2 g |
| water up to | 1 l |

The material now possessed sufficient sensitivity to be exposed on a repeater device, for example 6-channel multiplicator supplied with objectives having a resolution better than 600–700 lines/mm. After exposure the material was developed for 50 sec. in a solution with the following composition:

| | | |
|---|---|---|
| N-methyl-p-aminophenolsulphate | 0.67 | g |
| sodium sulphite (desic.) | 26 | g |
| quinol (hydroquinone) | 2.5 | g |
| sodium carbonate (desic.) | 26 | g |
| potassium bromide | 0.67 | g |
| gelatine | 1.67 | g |
| water up to | 1 | l |

The plate was then dipped for 15 sec. in a 2% solution of acetic acid and abundantly washed in distilled water. In this way a negative image of the original test was obtained on the silver bromide layer. After drying in the laminar clean box, a second exposure followed with ultra violet light, for example from a mercury lamp HBO-50 for 15 to 30 sec. The developed silver served as a photomask for the photoresist. The negative photoresist now became insoluble on the areas where light had been transmitted through the developed silver bromide layer. By dipping in acetone, the isolating intermediate layer was dissolved, thus stripping away the silver bromide image. The plate was washed abundantly in water, dried in the laminar clean box and was further processed according to the standard procedure recommended by the photoresist producer: dipped for 2 min. in a photoresist developer, followed immediately by rinsing in butylacetate for 30 sec., and post baked for 30 min. at 180°C. The chromium layer, left unprotected by the photoresist which had dissolved away, was now etched in a solution with the following composition:

| Solution A | | Solution B | |
|---|---|---|---|
| sodium hydroxide | 50 g | potassium ferricyanide | 100 g |
| dist. water | 100 ml | dist. water | 300 ml |

Before use one part of solution A was mixed with 3 parts of solution B. The etching continued for about 30 sec. after which the plate was abundantly washed in water. The last procedure was the removal of the polymerized photoresist in a mixture of sulphuric acid and hydrogen peroxide in ratio 1:1.

The photomask obtained was a positive copy of the original test and was of superior quality than the photomasks obtained by the conventional photolithography through contact printing on a chromium plate.

EXAMPLE 2

The evaporation of the chromium layer, the coating of the negative photoresist, the isolating intermediate layer and the evaporation of the silver bromide layer were carried out as described in Example 1. The evaporated silver bromide layer was sensitized by deposition in vacuum of a monoatomic layer of silver from a tungsten boat at a temperature 950°–1,100°C. At a distance between the boat and the substrate of about 25 cm this was achieved in 1–2 sec. On exposure and development as described in Example 1, a direct positive copy of the original was obtained on the silver bromide layer. After the ultra violet illumination and following the procedure of Example 1, a negative metal photomask was obtained. Because of the avoidance of conventional contact printing, the photomask obtained in this way had again a superior quality as compared with the photomasks produced by the standard techniques.

EXAMPLE 3

Following the technique of Example 1, a positive photoresist layer was coated on the evaporated chromium layer. Since the positive photoresist was soluble in acetone, an isolating intermediate layer, coated as described in Example 1, of the following composition was used:

2 parts of 4% solution in benzol of phenol-formaldehyde resin and 1 part of 6% solution in benzol of chrizoidine.

The sensitization, the exposure and the processing of the silver bromide layer followed the technique described in Example 1. After the ultra violet light exposure, the isolating intermediate layer was dissolved by dipping in benzol. This allowed the standard processing of the photoresist by dipping the plate in positive photoresist developer for 1 min. followed by an abundant washing in water and drying at 110°C for 15 min. to be carried out. The etching of the chromium layer was carried out with acid solutions for example hydrochloric acid, nitric acid, or the like. The positive photoresist was removed with acetone. Thus a negative metal copy of the original test was obtained which was again of superior quality compared with the photomasks produced by standard techniques.

EXAMPLE 4

The evaporation of the chromium layer, the coating of a positive photoresist, the isolating intermediate layer and the evaporation of the silver bromide layer were carried out as described in Example 3. The sensitization, the exposure and the processing of the evaporated silver bromide layer followed the techniques described in Example 2, while the chromium plate was processed as described in Example 3. Thus a positive metal copy of the original test was obtained having superior quality than the photomasks obtained by conventional photolithography through contact printing on a chromium plate.

We claim:

1. A photographic material for use in the direct production of photomasks which photographic material comprises:

i. a glass substrate;

ii. a layer of metal or metal oxide selected from the group consisting of nickel, chromium, Nichrome and iron oxide deposited on said glass substrate;

iii. a photoresist deposited on said layer of metal or metal oxide;

iv. a layer of phenol-formaldehyde resin deposited on said photoresist; and v. a layer of optically homogenous light-sensitive silver halide from 0.1 to 1 micron thick deposited by evaporation on the synthetic resin.

2. A photographic material as claimed in claim 1 in which the layer of metal or metal oxide which has been deposited on the glass substrate by evaporation.

3. A photographic material as claimed in claim 1 in which the layer of metal or metal oxide which has been deposited on the glass substrate by cathode sputtering.

4. A photographic material as claimed in claim 1, in which the photoresist is a positive photoresist and the synthetic resin is a phenol-formaldehyde resin which is soluble in hydrocarbons.

5. A photographic material as claimed in claim 1, in which the photoresist is a negative photoresist and the synthetic resin is a phenol-formaldehyde resin which is soluble in ketones, others and alcohols.

6. A photographic material as claimed in claim 1, in which the layer of synthetic resin contains a dye which absorbs light of wavelength longer than 450 nm.

7. A photographic material as claimed in claim 6 in which the dye absorbs light of wavelength longer than 400 nm.

8. A photographic material as claimed in claim 7 in which the dye is an azo-dye, a polymethin or a pyrazolon dye.

9. A photographic material as claimed in claim 8 in which the dye is chrysoidine, auramine or tartrazin.

10. A photographic material as claimed in claim 1, in which the silver halide is silver bromide, silver chloride or silver iodide or a combination thereof sensitized with gold-iridium salts or a monoatomic layer of silver.

11. A method of forming a photographic material as claimed in claim 1 which method comprises depositing on a glass substrate a thin layer of a metal or metal oxide selected from the group consisting of nickel, chromium, Nichrome and iron oxide, depositing on the metal or metal oxide a photoresist, depositing on the photoresist a layer of phenolformaldehyde resin and depositing by evaporation on the synthetic resin a optically homogenous light-sensitive halide.

12. A method according to claim 11 in which the thin layer of metal or metal oxide is applied by evaporation.

13. A method according to claim 11 in which the thin layer of metal or metal oxide is applied by cathode sputtering.

14. A method according to claim 11 which comprises depositing the photoresist by whirling, dipping or spraying.

15. A method according to claim 11 which comprises depositing the synthetic resin by whirling, dipping or spraying.

16. A method according to claim 11 which comprises vacuum evaporating a monoatomic layer of a metal to sensitize the silver halide layer.

17. A method according to claim 16 in which the metal is silver.

18. A method according to claim 11 which comprises treating the silver halide layer with a solution of gold-iridium salts to sensitize the silver halide layer.

19. A method of producing a photomask from a photographic material as claimed in claim 1 which comprises exposing the photographic material, developing on the light-sensitive silver halide layer an image which masks areas of the photoresist, again exposing the photographic material, removing the developed silver and the synthetic resin and developing on the photoresist an image which reveals areas of the metal or metal oxide layer, etching the metal or metal oxide layer and then removing the remainder of the photoresist, to obtain the desired photomask.

20. The photographic material of claim 1, wherein said silver halide layer is 0.2 to 0.5 microns thick.

* * * * *